PURE FLUID AMPLIFIER

Original Filed Dec. 17, 1963 2 Sheets-Sheet 1

INVENTOR,
BILLY M. HORTON

BY: Harry M. Saragovitz, Edward J. Kelly, Herbert Berl & J. P. Edgerton
ATTORNEYS.

INVENTOR,
BILLY M. HORTON

BY Harry M. Saragovitz,
Edward J. Kelly,
Herbert Berl &
J. D. Edgerton
ATTORNEYS.

United States Patent Office 3,331,382
Patented July 18, 1967

3,331,382
PURE FLUID AMPLIFIER
Billy M. Horton, Kensington, Md., assignor to the United States of America as represented by the Secretary of the Army
Continuation of application Ser. No. 331,328, Dec. 17, 1963. This application May 26, 1966, Ser. No. 554,282
7 Claims. (Cl. 137—81.5)

This application is a continuation of my application Ser. No. 331,328 filed Dec. 17, 1963, and now abandoned, for "Pure Fluid Amplifier."

The invention described herein may be manufactured and used by or for the Government for governmental purposes without the payment to me of any royalty thereon.

This invention relates generally to pure fluid amplifying systems and more specifically to a pure fluid amplifier which has the bias and the sensitivity thereof established and controlled by rotating or circulating fluid input signals.

Typically, pure fluid amplifiers; that is, fluid amplifiers which amplify the momentum of an input signal without any moving mechanical parts are formed by a sandwich-type structure consisting of an upper plate and a lower plate which serve to confine fluid flow to a planar flow pattern between the two plates. The pure fluid amplifier includes a main or power nozzle which extends through an end wall of an interaction chamber or region, the interaction chamber also being formed by two sidewalls (hereinafter referred to as the left and right sidewalls). One or more flow dividers disposed at a predetermined distance or distances from the end wall, and the leading edges or surfaces of the dividers are disposed relative to the main fluid nozzle centerline so as to define separate areas in a target plane. The sidewalls of the dividers in conjunction with the interaction region sidewalls establish the receiving apertures which are entrances to the amplifier output channels. Completing the description of the pure fluid amplifier, left and right control orifices may extend through the left and right sidewalls respectively. In the complete unit, the region bounded by top and bottom plates, sidewalls, the end wall, receiving apertures, dividers, control orifices and a main fluid nozzle, is termed an "interaction chamber region."

Two broad classes of pure fluid amplifiers are (I) Stream interaction (momentum exchange) or continuously variable control pressure devices and (II) Boundary Layer Control devices. Class I amplifiers include devices, in distinction to the devices of Class II, in which there is little or no interaction between the side walls of the interaction region and the power stream. Power stream deflection in such a unit is continuously variable in accordance with control signal amplitude the signal constituting a flow (or flows) which interacts with the power stream to deflect it as a result of momentum interchange between the streams and/or which controls the relative pressures in the regions on opposite sides of the power stream. Such a unit is referred to as a continuously variable amplifier or computer element. In an amplifier or computer element of this type, the detailed contours of the side walls of the interaction chamber are of secondary importance to the interacting forces between the streams themselves. Although the side walls of such units can be used to contain fluid in the interacting chamber, and thus make it possible to have the control flow effect the power stream in a region at some desired ambient pressure, the side walls are so placed that they are somewhat remote from the high velocity portions of the power stream so that it does not approach or attach to the side walls. Under these conditions the power stream flow pattern within the interacting chamber depends primarily upon the size, speed and direction of the power stream relative to the control flow and upon the density, viscosity, compressibility and other properties of the fluids employed.

(II) The second broad class of fluid amplifier and computer elements comprises units in which the main power stream flow and the surrounding fluid interact in such a way with the interaction region side walls that the resulting flow patterns and pressure distributions within the interaction region are greatly affected by the details of the design of the chamber walls. In this broad class of units, the power stream may approach or may contact the interaction region side walls. The effect of the side wall configuration on the flow patterns and pressure distribution, which can be achieved with single or multiple streams, depends upon the relation between: the width of the interaction chamber near the power nozzle, the width of the power nozzle, the position of the center line of the power nozzle relative to the side walls (symmetrical or asymmetrical), the angles that the side walls make with respect to the center line of the power nozzle; the length of the side walls or their effective length as established by the spacing between the power nozzle exit and the flow dividers, side wall contour and slope distribution; and the density, viscosity, compressibility and uniformity of the fluids used in the interaction region. It also depends on the aspect ratio, i.e. the ratio of the height to the width of the power nozzle, and therefore to some extent on the thickness of the amplifying or computing element in the case of two-dimensional units. The interrelationship between the above parameters is quite complex and is described subsequently. Response time characteristics are a function of size of the units and the density of the fluid and operating pressure.

Amplifying and computing devices of this second broad category which utilize boundary layer effects; i.e., effects which depend upon details of side wall configuration and placement, can be further subdivided into three sub-types:

(a) Boundary layer units in which there is no "lock on" effect.

(b) Boundary layer units in which "lock on" effects are appreciable.

(c) Boundary layer units in which "lock on" effects are dominant and which have "memory."

Sub-type (a) Boundary layer elements in which there is no "lock on" effect: Such a unit has a gain as a result of boundary layer effects. However, these effects do not dominate the control signal but instead combine with the control flows to provide a continuously variable output signal responsive to control signal amplitude. In these units the power stream remains diverted from its initial direction only if there is a continuing flow out of or into one or more of the control orifices.

Sub-type (b) Boundary layer units in which "lock on" effects are appreciable: In these units, the boundary layer effects are sufficient to maintain the power stream in a particular deflected flow pattern through the action of the pressure distribution arising from asymmetrical boundary layer effects and require no additional streams, other than the power stream to maintain that flow pattern. Naturally in this type unit continuous application of a control signal can also be used to maintain a power stream flow pattern. Such flow patterns can be changed to a new stable flow pattern, however, either by supplying or removing fluid through one or more of the control orifices, or through a control signal introduced by altering the pressures at one or more of the output apertures, as for example by blocking of the output channel to which flow has been directed.

Sub-type (c) Boundary layer control units which have "memory"; i.e., wherein lock-on characteristics dominate control signals resulting from complete blockage of the outlet to which flow has been commanded: In "memory" type boundary layer units, the flow pattern can be maintained through the action of the power stream alone without the use of any other stream or continuous application of a control signal. In these units, the flow pattern can be modified by supplying or removing fluid through one or more of the appropriate control orifices. However, certain parts of the power stream flow pattern, including "lock-on" to a given side wall, are maintained even though the pressure distribution in the output channel to which flow is being delivered is modified, even to the extent of completely blocking this output channel.

The power stream deflection phenomena in boundary layer units is the result of a transverse pressure gradient due to a difference in the effective pressures which exist between the power stream and the opposite interaction region side walls; hence, the term Boundary Layer Control. In order to explain this effect, assume initially that the fluid stream is issuing from the main nozzle and is directed toward the apex of a centrally located divider. The fluid issuing from the nozzle, in passing through the chamber, entrains some of the surrounding fluid in the adjacent interaction regions and removes this fluid therefrom. If the fluid stream is slightly closer to, for instance, the left side wall than to the right side wall, it is more effective in entraining and removing the fluid in the interaction region between the stream and the left wall than it is in entraining and removing fluid between the stream and the right wall since the former region is smaller. Therefore, the pressure in the left interaction region between the left side wall and power stream is lower than the pressure in the right interaction region and a differential pressure is set up across the power jet tending to deflect it towards the left side wall. As the stream is deflected further toward the left side wall, it becomes even more efficient in entraining fluid from the left interaction region and the effective pressure in this region is further reduced. In those units which exhibit "lock-on" features or characteristics, this feedback-type action is self-reinforcing and results in the fluid power stream being deflected toward the left wall and predominantly entering the left receiving aperture and outlet channel. The stream attaches to and is then directly deflected by the left side wall as the power stream effectively intersects the left side wall at a predetermined distance downstream from the outlet of the main orifice; this location being normally referred to as the "attachment location." This phenomena is referred to as boundary layer lock-on. The operation of this type of apparatus may be completely symmetrical in that if the stream had initially been slightly deflected toward the right side wall rather than the left side wall, boundary layer lock-on would have occurred against the right side wall.

Control of these units can be effected by controlled flow of fluid into the boundary layer region from control orifices at such a rate that the pressure in the associated boundary layer region becomes greater than the pressure in the opposing boundary layer region located on the opposite side of the power stream and the stream is switched towards this opposite side of the unit.

Alternatively instead of having flow into the boundary layer region to control the unit, fluid may be withdrawn from this "opposite" control orifice to effect a similar control by lowering the pressure on this "opposite" side of the stream instead of raising the pressure on the first side. The control flow may be at such a rate and volume as to deflect the power stream partially by momentum interchange so that a combination of the two effects my be employed. However, it is not essential, and in many cases is undesirable, that the control flow have a momentum component transverse to the power stream when the control fluid issues from its control orifice.

Only a small amount of energy is required in the control signal fluid flow to alter the power jet path so that some or all of the power jet becomes intercepted by the load device or output passage. For a continuously applied control signal, the power gain of this system can be considered equal to the ratio of the change of power delivered by the amplifier to its output channel or load to the change of control signal power required to effect this associated change of power delivered to the output channel or load. Similarly, the pressure gain can be considered equal to ratio of the change of output pressure to the change of control pressure required to cause the change; or, the ratio of the change of output channel mass flow rate to the associate change of control signal mass flow rate required defines the mass flow rate gain.

It is apparent that this second broad class of pure fluid amplifiers and components and systems provide units which can be interconnected with other units (for example, either class I or II elements) so that the output signal of one unit can provide the control or power jet supply of a second unit. Since each stage can have a gain greater than unity, a given stage can be used to drive a larger second stage, or several second stages each of which is the same size as the first.

The term "input signal" is defined as the fluid signal which is intentionally supplied to the fluid component for the purpose of instructing or commanding that component to provide a desired output signal. The term "output signal" used herein is the fluid signal which is produced by the fluid component. The input and output signals can be in the form of time or spatial variations in pressure, density, flow velocity, mass flow rate, fluid composition, transport properties, or other thermodynamic properties of the input fluid, individually or in combination thereof. The term "fluid" as used herein includes compressible as well as incompressible fluids, fluid mixtures and fluid combination, and suspensions of solid particles in a fluid.

The present invention is directed primarily to an arrangement for introducing control signals into pure fluid systems and is equally applicable to both of the classes and to the sub-classes of fluid amplifiers set forth above. The invention provides apparatus for introducing control signals in such a way as to minimize turbulence resulting from interaction between power and control fluid flows thereby providing smoother and steadier flow patterns of lower noise levels and of greater long term stability than otherwise might be available.

More particularly, control signals are introduced into the system by means of flow directed generally parallel to the flow of the main or power stream.

The control nozzle takes the form of a substantially cylindrical or spiral-shaped chamber which is positioned essentially tangentially to the sidewalls of the interaction chamber, the cylindrical or spiral-shaped chamber communicating with the interaction chamber through a port formed essentially at the point of tangency. The power stream flowing across the port of the cylindrical chamber causes a momentum interchange to occur between the power stream and the fluid in the cylindrical chamber. This momentum interchange takes place because of the viscous effects within the fluid and because of turbulent mixing. The momentum interchange which occurs causes some of the fluid in the chamber to be entrained in power stream thereby reducing the pressure in the chamber and further produces rotation or circulation of the fluid in the substantially-cylindrical chamber, further varying the pressure distribution therein. By varying or governing the internal feed of fluid to the center and/or flow from the periphery of the cylindrical control nozzles, it is possible to control the pressures on opposite sides of the power stream and therefore control its displacement relative to the output channels. This type of arrangement is equally applicable to class I and class II amplifiers. In class I devices the control flows establish a power stream position which is a function of the relative flows to and/or from the control nozzles. In the class II devices, switching of the control flows causes the device to switch positions.

As mentioned hereinabove pure fluid amplifying systems are typically constructed of two or three flat plates sandwiched together and held in a fluid-tight relationship by machine screws, clamps, adhesives or any other suitable means. If only two flat plates are used, the passages, cavities and orifices needed to form the fluid amplifier component are created in one plate by etching, molding, milling, casting or other conventional techniques, and the other plate is sealed to the one plate to cover these passages, cavities and orifices. When the sandwich type structure comprises three plates, the center plate usually is cut out or shaped by other means to provide the desired configuration of the fluid amplifier component and the remaining two plates provide upper and lower covering plates for sandwiching and sealing the center plate therebetween.

Although conventional techniques for forming cavities, passages and orifices are capable of providing relatively close dimensional tolerances, the fluid output in the amplifying system oftentimes reflects slight dimensional deviations in either the size, shape or position of the elements forming the system from the true design dimensions. For example, in the absence of an input signal, deviations in the dimensions of the passages, cavities or orifices from the determined design dimensions may cause the system to have an inherent bias so that the flow or pressure pattern in the output passages is either undesirably asymmetrical or undesirably symmetrical in comparison to the desired flow or pressure pattern. If the system were to provide a null bias output signal from the output passages in the absence of a control signal, an unequal flow or pressure condition in these passages would be undesirable, whereas if a bias output signal were desired equal flow or pressure in the output passages would be undesirable. In either instance, it is usually important that the bias of the particular fluid amplifier be either present or absent, and in any event be known to those who wish to use the system either as a single component or in combination with other pure fluid components, or with other types of fluid systems.

The amount of bias in a particular pure fluid amplifying system may be readily ascertained by applying a power stream to the power nozzle of the amplifier and sensing the differentials in mass flow, energy or pressure from the output passages by suitable fluid sensing instruments. Since this determination is preferably made after the plates have been sealed in fluid-tight relation, one to the other, the problem then arises of being able to increase, decrease or eliminate the bias of the system.

Hitherto, when a pure fluid component was found to be undesirably biased, the component would be discarded as a reject because known methods for correcting this condition involved excessive expenditures of time and effort. Those working in the art will appreciate the problems of initially locating the reason for the bias condition and thereafter attempting to correct the condition. When the plates are bonded together by a high-pressure-resistant adhesive, they ordinarily cannot be separated without changing or destroying their shapes and thus the possibility of being able to satisfactorily separate the plates so that they could be used again is unfeasible. Thus, there appeared to be no solution to the problem of eliminating the bias of, or providing a desired bias to, the enclosed pure fluid system in the absence of a control stream flow a control nozzle.

In addition, it is generally desirable to provide a pure fluid amplifier that possesses at least some predetermined sensitivity to control input signals so that the magnitude of the control input signal required to displace the power stream through a given angle will be either known or predictable.

In accordance with a further feature of the present invention, bias control may be effected by control of flow to and/or from the control nozzles to vary the initial position of the power stream. Such control may be employed in a class I or class II *a* system to establish initially a center position or somewhat deflected position of the power stream in accordance with the desired operating characteristics of the system. In class II *b* and *c* types, the present invention may be employed to cause the device to assume a predetermined state on start-up. In controlling initial bias of the power stream, the apparatus also provides control of sensitivity of the device. Establishing initial control flows also establishes changes of flow in one nozzle required to produce a specific change in power stream position relative to the initial position resulting at least partially for the initial flow in the other control nozzle.

It is an object of the invention to provide a pure fluid amplifier, wherein the bias and sensitivity thereof is governed by flow which is rotating tangentially to the power stream and interacting therewith.

More specifically, it is an object of this invention to provide a pure fluid amplifier, wherein the power stream generates a rotating control stream by momentum interchange, and wherein the rotating control stream effects an amplified directional displacement of the power stream in the pure fluid amplifier.

Another object of this invention is to provide a fluid amplifier in which energy losses are minimized by providing a geometrical shape which permits a smooth circular flow pattern in the interaction region of the streams.

Another object of this invention is to provide a pure fluid amplifier including a power nozzle, an interaction chamber for receiving fluid egressing from the power nozzle, and a substantially-cylindrical control nozzle located tangentially of the interaction chamber having an opening across which the power jet issuing from the power nozzle can flow and thereby generate circulating fluid flow in the substantially-cylindrical chamber, the circulating flow in the substantially-cylindrical chamber controlling the displacement of the power stream in the interaction chamber by momentum interchange, or by supplying fluid to control the fluid pressure in the boundary layer region in the interaction chamber.

Still another object of the present invention is to provide control fluid flow to the interaction region of a fluid amplifier in such a manner that turbulent mixing of fluids is minimized and laminar flow is maximized.

The above and still further objects, features and advantages of the present invention will become apparent upon consideration of the following detailed description of several specific embodiments thereof, especially when taken in conjunction with the accompanying drawings, wherein:

FIGURE 1 illustrates one embodiment of a pure fluid amplifier constructed in accordance with this invention;

FIGURE 1*a* is a side view of the pure fluid amplifier shown in FIGURE 1;

Figures 1, 1A:
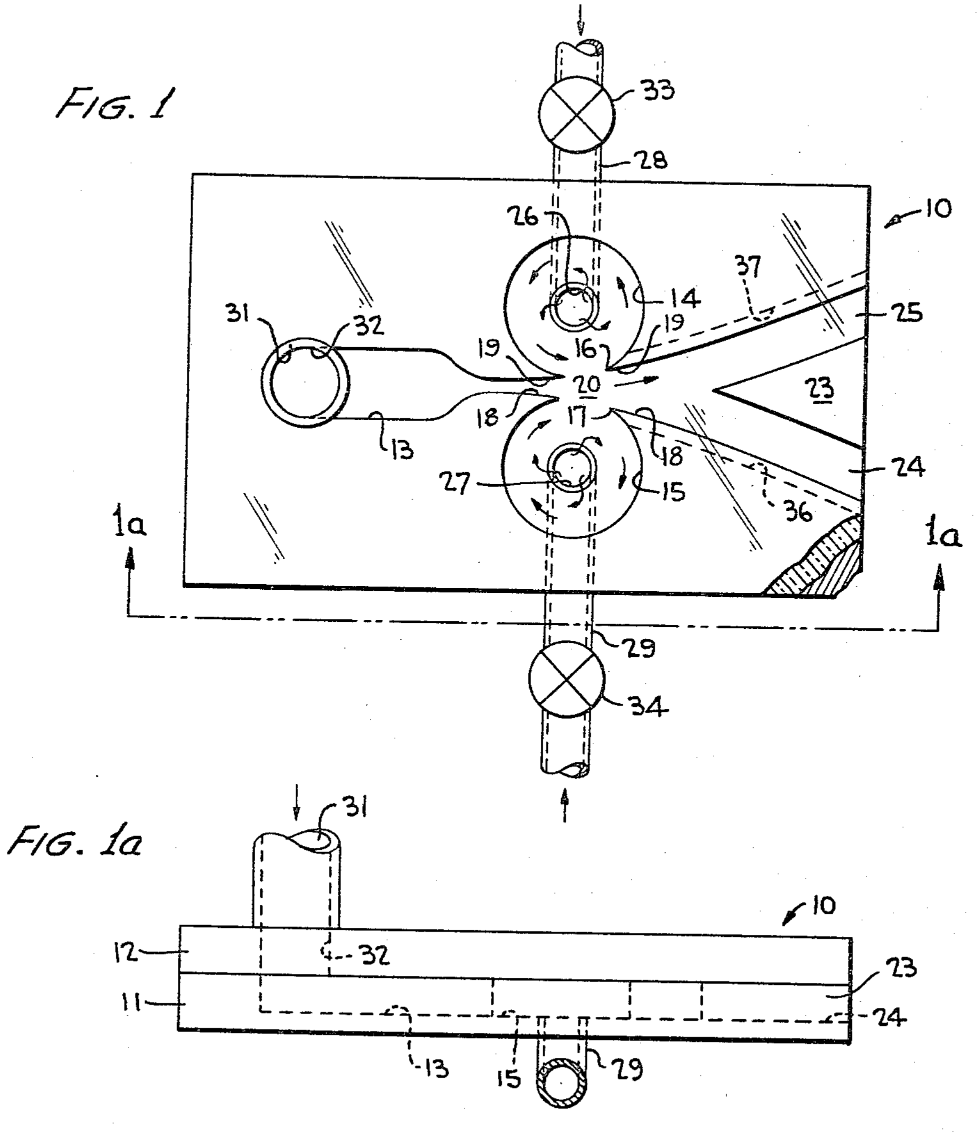

Referring now to FIGURE 1 of the accompanying drawings for a more complete understanding of the invention, there is shown a pure fluid amplifier 10 formed between a pair of flat plates 11 and 12 which are sealed one to the other by machine screws, adhesives, or other suitable means. The configuration defining the pure fluid amplifier 10 is formed in the flat plate 11 and the plate 12 covers the plate 11 in a fluid-tight relationship. The pure fluid amplifier 10 includes a power nozzle 13, a pair of what will hereinafter be referred to as "control nozzles" 14 and 15 of substantially cylindrical shape and of substantially the same size that communicate by means of ports 16 and 17, respectively with the sidewalls 18 and 19 of an interaction chamber 20. The control nozzles 14 and 15 are positioned substantially tangentially to the sidewalls 18 and 19 and the ports 16 and 17 are preferably located opposite each other and at the points of approximately tangency. Located downstream of the interaction chamber 20 is a flow splitter 23 and a pair of output passages 24 and 25, respectively, which receive fluid from the interaction chamber 20. Fluid enters the control nozzles 14 and 15 through substantially centrally located orifices 26 and 27, respectively, which have tubes 28 and 29, respectively, threadedly connected therein. The diameters of the orifices 26 and 27 are preferably equal and considerably less than the diameters of the control nozzles 14 and 15 so that a planar base of large radius is provided in the nozzles 14 and 15 upon which the rotating fluid can flow. Fluid may be supplied to the tubes 28 and 29 in order to vary the amount of fluid within the control nozzles 14 and 15.

The power nozzle 13 is supplied fluid by means of a tube 31 which is threadedly connected to a bore 32 formed in plate 12, the bore 32 communicating with the input end of the control nozzle 13, as shown. Fluid supplied to the tube 31 is constricted by the configuration of the power nozzle 13 and issues as a defined power stream into the interaction chamber 20. Assuming that the control nozzles 14 and 15 communicate with sources of fluid, the power stream which is constricted by the sidewalls 18 and 19 flows across the ports 16 and 17 and a momentum interchange is created between fluid present in the control nozzles 14 and 15 and the fluid at the edges or fringes of the power stream. Some of the fluid is entrained in the main power stream thereby reducing the pressure at the ports 16 and 17. Other portions of the fluid are caused to move but remain in the nozzle 14 and due to viscous drag produce rotation of the fluid in the control nozzles 14 and 15 in the directions indicated by the arrows.

As the rotation in nozzle 14 increases, there is produced a difference between the static pressure at the outside edge of nozzle 14 and the static pressure at the entrance of the port 26 into the nozzle 14. This difference in static pressure within the nozzle is brought about by the centrifugal forces associated with the rotation mass of fluid in nozzle 14. Thus the static pressure at the port 26 is less than the static pressure at the outside edge of the nozzle 14 and therefore the static pressure at the port 26 is less than the static pressure at the port 16. Thus the rotation of the fluid in nozzle 14 tends to draw fluid through tube 28 into nozzle 14 to equalize the pressure in the nozzle and also to supply the entrainment fluid. The rotation of fluid in the nozzle 14 also permits the fluid flowing through the port 26 to be introduced into the interaction chamber 20 in such a way that velocity gradients transverse to the power stream issuing from the nozzle 13 are minimized. Thus one advantage of this pure fluid amplifier is that the tendency for turbulent mixing to occur is reduced, and since turbulent mixing of streams causes more loss of energy than laminar mixing, this way of introducing control fluid provides a fluid amplifier of greater efficiency.

A further advantage of this type of nozzle is that it permits the use of control fluid at a lower pressure than if the control stream were brought into the interaction region at a right angle to the power stream. In a similar manner the rotation of fluid in nozzle 15 causes the static pressure in port 27 to be less than the static pressure at port 17 and along the outside edge of nozzle 15. Thus the rotation tends to draw in more fluid through tube 29 than if the fluid were brought in at a right angle to the power stream issuing from nozzle 13. Here again the control fluid passing through port 17 is introduced into chamber 20 with a velocity in the direction of flow of the power stream, reducing the velocity gradients transverse to the power stream.

The displacement of the power stream in the interaction chamber 20 is governed by a differential in static pressure developed transversely of the power stream as it crosses the ports 14 and 15. Increases or decreases in the static pressure is governed by varying the amount of fluid supplied to the control nozzles 14 and 15 through the orifices 26 and 27 respectively. Thus the position of the stream relative to the flow divider 23 is a function of relative amounts of fluid supplied through pipes 28 and 29. These flows may be employed as indicated above to amplify input function and/or to control bias and sensitivity of the unit. Regulation of the quantity of fluid supplied to the control nozzles 14 and 15, can be made externally of the fluid amplifier 10 by means of valves 33 and 34 or by means of pure fluid elements disposed in the pipes.

In operation, if a relatively greater amount of fluid is supplied to the control nozzle 14 than to the control nozzle 15 by regulation of the valves 33 and 34, respectively, the power stream will be displaced closer to the sidewall 18 than towards the sidewall 19. The quantities of flows supplied initially determine the bias of the unit and the sensitivity of the power stream to control fluid signals superimposed upon the bias flows initially supplied. As will be evident to those working in the art, it is therefore a relatively easy matter to provide an initial bias and sensitivity to the power stream and thereafter superimpose or apply a control fluid input signal to the fluid in the tubes 28 and 29 to effect amplified displacement of the power stream relative to the upstream entrances to output passages 24 and 25, respectively.

The sidewalls defining the output passages 24 and 25 may also be set back relative to the openings 16 and 17, respectively as indicated by the dotted lines 36 and 37 so that the combined power and control streams will tend to attach to either of the walls indicated by the numerals 36 and 37, of the output passages 24 and 25, respectively, and be displaced therefrom by fluid issuing into the point of attachment from the control nozzles 14 and 15, respectively. Thus, the pure fluid amplifier 10 may also be a class II type pure fluid amplifier as discussed hereinabove. If the sidewalls are set back the pressure in the control nozzles will be further reduced. The pressure reduction caused by the centrifugal action of the rotating fluid will add to the pressure reduction caused by setting back the walls as shown by the dotted lines in FIGURE 1.

Figures 2, 3:
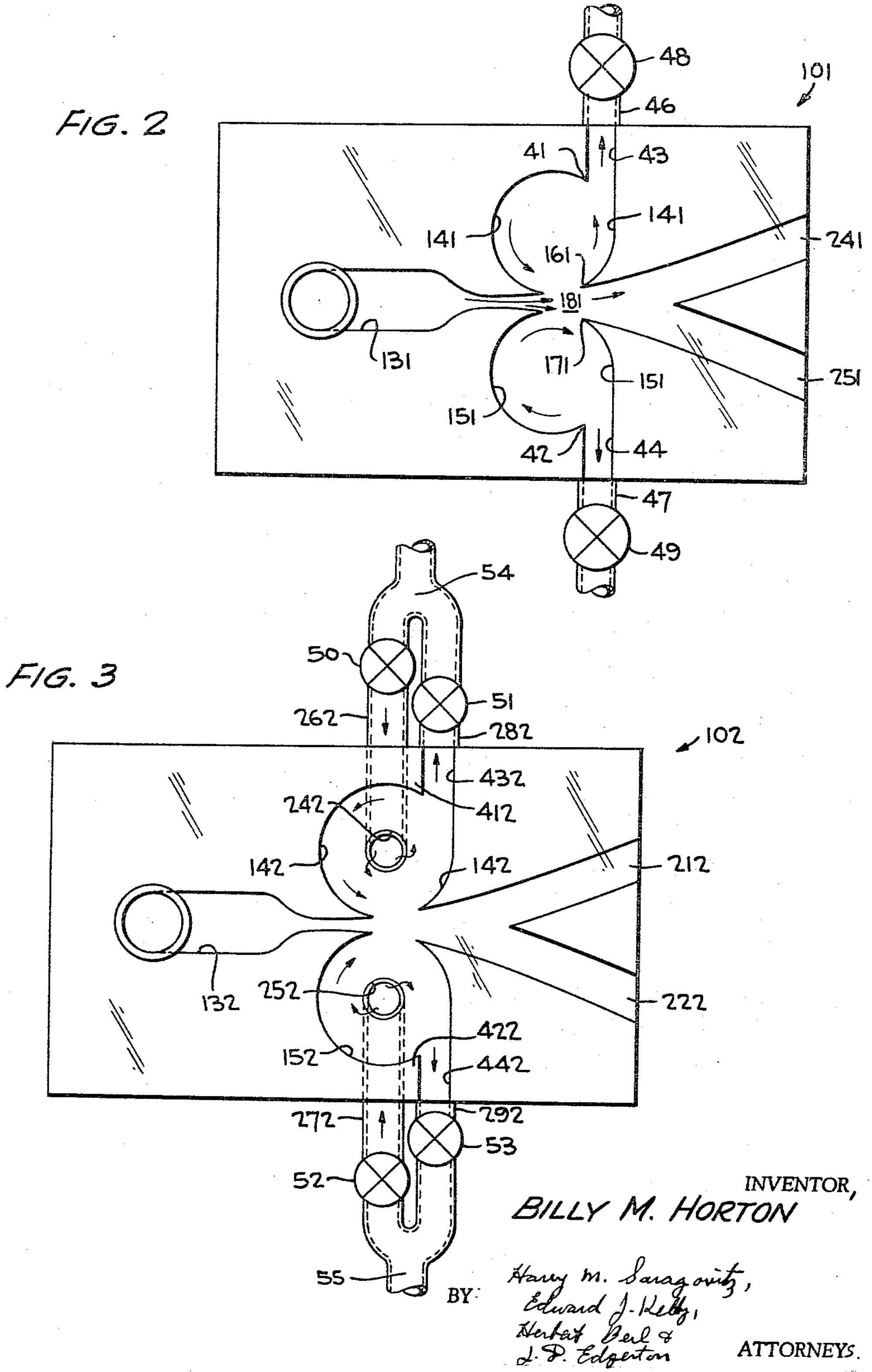
FIGURE 2 illustrates another embodiment of a pure fluid amplifier constructed in accordance with this invention.
FIGURE 3 illustrates yet another embodiment of a pure fluid amplifier in accordance with the instant invention.

FIGURE 2 illustrates a pure fluid amplifier designated by numeral 101, which is a modification of the pure fluid amplifier 10 illustrated in FIGURE 1. In the pure fluid amplifier 101, the cylindrical control nozzles 141 and 151 are provided with cusps 41 and 42, respectively, which are designed to scoop off fringe portions of the circulating flow into the passages 43 and 44, respectively, that extend tangentially from the periphery of the control nozzles 141 and 151, respectively. Tubes 46 and 47 which may incorporate valves 48 and 49, respectively, are threadedly connected to the downstream end of the passages 43 and 44, respectively. The valves 48 and 49 may be used to vary the amount of fluid which egresses from the passages 43 and 44 and thereby vary the back pressure in the circular control nozzles 141 and 151. In this embodiment, as in the embodiment illustrated in FIGURE 1 of the accompanying drawings, and discussed in detail hereinabove, the circulation induced in the nozzles 141 and 151 by the power stream, in directions indicated by the arrows, may be utilized to control the position of the power stream in the interaction chamber 181. In addition, the power stream position may be controlled by backloading of the passages 43 and 44 by pure fluid systems to which the tubes 46 and 47 are connected or by backloading with other types of fluid or non-fluid systems; and the output from the passages 241 and 251 will be controlled by the backloading or the magnitude of the control signals applied to the tubes 46 and 47. Also, as discussed in regard to FIGURE 1, the sidewalls of the output passages 241 and 251 may be alternatively set back so that boundary layer effects will be generated and class II operation effected.

Referring now to FIGURE 2 of the accompanying drawings, there is shown another embodiment of a pure fluid amplifier designated by the numeral 102, which basically represents the combination of the aforedescribed pure fluid amplifiers 10 and 101, illustrated respectively in FIGURES 1 and 2 of the accompanying drawings. In this embodiment, the substantially cylindrical control nozzles 142 and 152 are provided with tangentially extending passages 432 and 442, respectively, and cusps 412 and 422 respectively that scoop fringe portions of the fluid rotating in the control nozzles 142 and 152 into the passages 432 and 442. In addition, orifices 242 and 252 are formed centrally in the substantially planar bases of the control nozzles 142 and 152 to supply fluid input signals to the control nozzles. The orifices 242 and 252 have the two tubes 262 and 272 respectively threadedly connected therein, and the tubes 282 and 292 are respectively threadedly connected into the downstream ends of the passages 432 and 442. A T-shaped junction designated by the numeral 54 joins the tubes 262 and 282, through the valves 50 and 51, respectively, and a similar T-shaped junction 55 joins the tubes 272 and 292 through valves 52 and 53, respectively. The valves 50, 51, 52 and 53 can be adjusted such that the valves 50 and 52 valve a predetermined amount of fluid into the control nozzles 142 and 152 through the tubes 262 and 272, respectively, and the valves 51 and 53 produce a predetermined backloading pressure against fluid egressing from the passages 432 and 442, respectively.

Input fluid control signals are supplied to the T-junctions 54 and 55 after a predetermined bias or sensitivity has been established by adjustment of the four valves 50, 51, 52 and 53, and as a result a predetermined power stream bias and sensitivity is developed. Thereafter, fluid input or control signals received by the two junctions 54 and 55 will effect amplified displacement of the power jet issuing from the power nozzle 132, for reasons discussed hereinabove.

In the aforedescribed three pure fluid amplifiers, the momentum interchange that occurs between the substantially cylindrical control nozzles located tangentially of the sidewalls of the interaction chamber and the power jet minimizes the energy losses which normally result when there is direct impingement of a defined control jet against a defined power jet. Such is the case, for example, in conventional pure fluid amplifying systems incorporating control nozzles that converge or taper to egress orifices formed in the sidewalls of the interaction chamber adjacent the power nozzle orifices. Thus, the instant invention in addition to providing a predetermined or an adjustable bias and sensitivity to the power stream also reduces the momentum exchange losses inherent in the stream interaction in conventional pure fluid amplifiers.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A pure fluid amplifier comprising an interaction chamber including a pair of opposed sidewalls for transversely restricting the movement of a fluid stream, a power nozzle for issuing a power stream into one end of said interaction chamber, at least one chamber of substantially cylindrical shape with the periphery thereof positioned substantially tangentially to the surface defining one of said sidewalls, a port formed between said cylindrical chamber and said interaction region as a result of convergence of the surfaces of said chamber sidewall and said cylindrical chamber at the point of tangency of said surfaces so that the power stream flowing across said port interacts with fluid in said cylindrical chamber and produces unidirectional circulation of fluid therein, and an ingress passage communicating with said cylindrical chamber for supplying fluid thereto.

2. The pure fluid amplifier as claimed in claim 1 wherein two essentially cylindrical chambers of substantially equal diameter are provided in substantially opposed relationship with respect to said interaction chamber so as to provide ports into said interaction region on opposite sides of said interaction region.

3. The pure fluid amplifier as claimed in claim 1 wherein said cylindrical chamber has a longitudinal axis of symmetry, and wherein an orifice is formed in said cylindrical chamber on said axis, the diameter of said orifice being considerably less than the diameter of said cylindrical chamber, and wherein said ingress passage is connected to said orifice so as to supply fluid to said cylindrical chamber.

4. The pure fluid amplifier as claimed in claim 1 wherein an egress passage extends substantially tangentially from said cylindrical chamber in the direction of fluid circulation in said cylindrical chamber so that a portion of the circulating fluid is received by said egress passage.

5. The pure fluid amplifier as claimed in claim 4, wherein means are provided for regulating the quantity of fluid supplied to said ingress passage and, means are provided for regulating the back pressure in said egress passage.

6. A pure fluid amplifier comprising an intreaction chamber including a pair of opposed sidewalls for transversely restricting the movement of a fluid stream, a power nozzle for issuing a power stream into one end of said interaction chamber, at least one chamber of substantially cylindrical shape with the periphery thereof positioned substantially tangentially to the surface defining one of said sidewalls, a port formed between the cylindrical chamber and said interaction region as a result of convergence of the surfaces of said chamber sidewall and said cylindrical chamber at a point of tangency of said surfaces so that the power stream flowing across said port interacts with fluid in said cylindrical chamber and produces unidirectional circulation of fluid therein, and an egress passage extending substantially tangentially from the periphery of said cylindrical chamber in the direction of fluid circulation for receiving a portion of the circulating fluid therefrom.

7. A pure fluid amplifier comprising an interaction chamber including a pair of opposed sidewalls for transversely restricting the movement of a fluid stream, a power nozzle for issuing a power stream into one end of said interaction chamber, at least one chamber of substantially cylindrical shape with the periphery thereof positioned substantially tangentially to the surface defining one of said sidewalls, a port formed between said cylindrical chamber and said interaction region as a result of convergence of the surfaces of said chamber sidewalls and said cylindrical chamber at the point of tangency of said surfaces so that the power stream flowing across said port interacts with fluid in said cylindrical chamber and produces circulation of fluid therein, and means for controlling deflection of said power stream comprising a passage connected to said chamber remote from said port and means for controlling flow of fluid through said passage relative to said chamber.

References Cited

UNITED STATES PATENTS

| | | | |
|---|---|---|---|
| 1,381,095 | 6/1921 | Starr | 137—81.5 |
| 2,841,182 | 7/1948 | Scala | 138—39 |
| 2,894,703 | 7/1959 | Hazen | 137—81.5 |
| 2,910,830 | 11/1959 | White | 137—81.5 |
| 3,149,783 | 9/1964 | Sosnick | 137—81.5 |
| 3,158,166 | 11/1964 | Warren | 137—81.5 |
| 3,192,938 | 7/1965 | Bauer | 137—81.5 |
| 3,195,303 | 7/1965 | Widell | 137—81.5 |
| 3,208,462 | 9/1965 | Fox | 137—81.5 |
| 3,216,439 | 11/1965 | Manion | 137—81.5 |
| 3,233,621 | 2/1966 | Manion | 137—81.5 |

M. CARY NELSON, *Primary Examiner.*

W. CLINE, *Assistant Examiner.*